(12) United States Patent
Nishizawa

(10) Patent No.: US 9,846,305 B2
(45) Date of Patent: Dec. 19, 2017

(54) HEAD MOUNTED DISPLAY, METHOD FOR CONTROLLING HEAD MOUNTED DISPLAY, AND COMPUTER PROGRAM

(71) Applicant: SEIKO EPSON CORPORATION, Tokyo (JP)

(72) Inventor: Kazuo Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/870,864

(22) Filed: Sep. 30, 2015

(65) Prior Publication Data

US 2016/0109703 A1  Apr. 21, 2016

(30) Foreign Application Priority Data

Oct. 20, 2014  (JP) .................................. 2014-213543

(51) Int. Cl.
| | |
|---|---|
| *G09G 5/00* | (2006.01) |
| *G02B 27/01* | (2006.01) |
| *G06F 3/01* | (2006.01) |
| *H04N 5/77* | (2006.01) |
| *G06F 3/147* | (2006.01) |
| *G09G 3/00* | (2006.01) |
| *H04N 101/00* | (2006.01) |

(52) U.S. Cl.
CPC ............ *G02B 27/017* (2013.01); *G06F 3/013* (2013.01); *G06F 3/147* (2013.01); *G09G 3/001* (2013.01); *H04N 5/77* (2013.01); *G02B 2027/014* (2013.01); *G02B 2027/0134* (2013.01); *G02B 2027/0138* (2013.01); *G02B 2027/0141* (2013.01); *G02B 2027/0178* (2013.01); *G02B 2027/0187* (2013.01); *H04N 2101/00* (2013.01)

(58) Field of Classification Search
CPC .............................. G06F 3/013; G02B 27/017
USPC .................................................. 345/7, 8, 633
See application file for complete search history.

(56) References Cited

U.S. PATENT DOCUMENTS

| | | | |
|---|---|---|---|
| 9,025,252 B2 * | 5/2015 | Lewis ................... | G06T 7/0042 345/7 |
| 2012/0021806 A1 * | 1/2012 | Maltz ..................... | H04W 4/20 455/566 |
| 2013/0038510 A1 * | 2/2013 | Brin ..................... | G02B 27/017 345/8 |
| 2013/0044042 A1 * | 2/2013 | Olsson ............... | G02B 27/0176 345/8 |
| 2013/0050833 A1 * | 2/2013 | Lewis ................... | G06T 7/0042 359/630 |

(Continued)

FOREIGN PATENT DOCUMENTS

| | | |
|---|---|---|
| JP | 2013-254358 A | 12/2013 |
| JP | 2013-257492 A | 12/2013 |
| JP | 2014-071230 A | 4/2014 |

*Primary Examiner* — Calvin C Ma
(74) *Attorney, Agent, or Firm* — Oliff PLC

(57) ABSTRACT

A head mounted display includes a sight line direction detection section that detects the direction of a user's sight line, an image display section that has an image display area where an image is displayed, and a display image setting section that allows display of at least part of an image in the image display area and changes, based on the detected direction of the sight line, at least one of the at least part of the image displayed in the image display area and a display position of the image displayed in the image display area.

12 Claims, 8 Drawing Sheets

(56) References Cited

U.S. PATENT DOCUMENTS

2013/0335461 A1  12/2013  Rekimoto
2015/0116203 A1   4/2015  Narita et al.

\* cited by examiner

| DIRECTION OF SIGHT LINE (RIGHT EYE) | FRONTWARD | RIGHTWARD | LEFTWARD | UPWARD | DOWNWARD |
|---|---|---|---|---|---|
| IMAGE DATA RELATED AREA | CENTER | RIGHTWARD | LEFTWARD | UPWARD | DOWNWARD |

HEAD MOUNTED DISPLAY, METHOD FOR CONTROLLING HEAD MOUNTED DISPLAY, AND COMPUTER PROGRAM

BACKGROUND

1. Technical Field

The present invention relates to a technology for a head mounted display.

2. Related Art

A head mounted display (HMD), which is a display apparatus mounted on a head, has been known. A head mounted display generates image light, for example, by using a liquid crystal display and a light source and guides the generated image light to a user's eyes by using a projection system and a light guide plate to allow the user to visually recognize a virtual image. The head mounted display is classified into two types: a transmissive head mounted display that allows the user to visually recognize an outside scene as well as a virtual image; and a non-transmissive head mounted display that does not allow the user to visually recognize an outside scene. A transmissive head mounted display is further classified into an optically transmissive head mounted display and a video-transmissive head mounted display.

JP-A-2014-71230 discloses a display apparatus that acquires information on the luster of a user's eyes imaged with an imager, sets an area around the user's focal position where a virtual image is displayed based on the acquired information on the luster, and lowers the luminance and contrast in the area outside the set area. JP-A-2013-257492 discloses a display apparatus that adjusts, based on the luminance in a non-display area where no image is displayed, the luminance in an image display area where an image is displayed. JP-A-2013-254358 discloses an image processing apparatus that identifies the center of the range of a user's sight line based on the orientation and motion of the user's pupils detected with a camera and adjusts the contrast in a portion of a displayed image that corresponds to the identified center of the range of the sight line.

The technologies described in JP-A-2014-71230, JP-A-2013-257492, and JP-A-2013-254358, however, simply change the luminance and contrast in a predetermined area in accordance with the direction of a user's sight line, and there has been a desire to change other factors as well as the luminance and contrast in accordance, for example, with the direction of the user's sight line. Additionally, in image processing technologies of related art, size reduction, cost reduction, resource conservation, ease of manufacturing, improvement in ease of use, and other improvements have been desired.

SUMMARY

An advantage of some aspects of the invention is to solve the problems described above, and the invention can be implemented as the following aspects.

(1) An aspect of the invention provides a head mounted display. The head mounted display includes a sight line direction detection section that detects the direction of a user's sight line, an image display section that has an image display area where an image is displayed, and a display image setting section that allows display of at least part of an image in the image display area and changes, based on the detected direction of the sight line, at least one of the at least part of the image displayed in the image display area and a display position of the image displayed in the image display area. According to the head mounted display of the aspect, the image that can be visually recognized by the user changes in accordance with the direction of the user's sight line. Therefore, even though the image display area has a limited size, the user can change the direction of the sight line to practically visually recognize an image larger than the size displayable in the image display area, whereby the convenience of the user is improved.

(2) In the head mounted display according to the aspect described above, the image display area may be divided into a plurality of areas, at least two of the plurality of divided areas may share at least a portion as a common area, and to change the display position based on the identified direction of the sight line, the display image setting section may select one of the plurality of areas that is related to the direction of the sight line and allow display of an image in the selected one area. According to the head mounted display of the aspect, even when the image displayed in the image display area changes in correspondence with a change in the direction of the user's sight line, at least part of the same image is displayed before and after the change, and the user can therefore recognize the positional relationship between the images displayed in the image display area before and after the change, whereby the convenience of the user is further improved.

(3) In the head mounted display according to the aspect described above, when the image is formed of a stationary image, the display image setting section may select one of the plurality of areas that is related to the direction of the sight line and allow display of the stationary image in the selected one area. According to the head mounted display of the aspect, limited types of image are displayed in the image display area, which means that the user can recognize which direction of the sight line the currently displayed image is related to, and the user can recognize which direction of the sight line the current direction should be changed to in order to display an image that the user desires to visually recognize next, whereby the convenience of the user is further improved.

(4) In the head mounted display according to the aspect described above, the display image setting section may change at least one of the at least part of the image displayed in the image display area and the display position at a speed slower than the speed at which the detected direction of the sight line changes. According to the head mounted display of the aspect, the image displayed in the image display area is not switched to another instantaneously in response to a change in the direction of the user's sight line, whereby a burden on the user's eyes can be reduced.

(5) In the head mounted display according to the aspect described above, the display image setting section may set the relationship between the speed at which the detected direction of the sight line changes and the speed at which the image displayed in the image display area changes differently depending on whether the image is formed of motion images or stationary images. According to the head mounted display of the aspect, since the speed of the change in the image displayed in the image display area changes in accordance with whether the image is formed of stationary images or motion images, the user can distinguish whether the display image is formed of stationary images or motion images based on the speed at which the image changes. When the displayed image is formed of stationary images, gradually changing the display image allows further reduction in the burden on the user's eyes.

(6) In the head mounted display according to the aspect described above, the sight line direction detection section may capture images of the user's eyes and detect the direction of the sight line based on the captured images of the user's eyes. According to the head mounted display of the aspect, the direction of the user's sight line can be readily identified.

(7) The head mounted display according to the aspect described above may further include an eye image storage section that stores a plurality of images of the user's eyes from which the sight lines are oriented in different directions, and the sight line direction detection section may compare the captured images of the user's eyes with the plurality of stored images of the user's eyes to detect the direction of the sight line. According to the head mounted display of the aspect, the direction of the user's sight line can be more readily identified.

(8) The head mounted display according to the aspect described above may further include a head orientation detection section that detects the orientation of the user's head, and the display image setting section may change, based on the detected orientation of the head and the detected direction of the sight line, at least one of the at least part of the image displayed in the image display area and the display position of the image. According to the head mounted display of the aspect, since the image visually recognized by the user changes in accordance with the combination of the orientation of the user's head and the direction of the user's sight line, the user can visually recognize a variety of images by changing the orientation of the head and the direction of the sight line even though the image display area has a limited size.

(9) In the head mounted display according to the aspect described above, the image display section may transmit an outside scene, and when the detected sight line is oriented frontward, the display image setting section may allow display of an image in an area except a central area of the image display area, and when the direction of the sight line changes from the frontward direction to a direction other than the frontward direction, the display image setting section may allow display of an image related to the direction of the sight line after the change in the image display area including the central area. According to the head mounted display of the aspect, when the user's sight line is oriented frontward, it is determined that the user desires to visually recognize an outside scene, and an image is displayed in an area other than the central portion of the image display area. The user can therefore visually recognize the outside scene or the image that the user desires to visually recognize only by changing the direction of the sight line, whereby the convenience of the user is improved.

All the plurality of components in the aspects of the invention described above are not essential, and part of the plurality of components can be changed, omitted, replaced with new other components as appropriate, and part of the limiting conditions can be omitted as appropriate in order to achieve part or entirety of the advantageous effects described in the present specification. Further, to achieve part or entirety of the advantageous effects described in the present specification, part or entirety of the technical features contained in any one of the aspects of the invention described above can be combined with part or entirety of the technical features contained in another one of the aspects of the invention described above to form an independent aspect of the invention.

For example, an aspect of the invention can be implemented as an apparatus including one or more of the following three elements: the sight line direction detection section; the image display section; and the display image setting section. That is, the apparatus may or may not include the sight line direction detection section. Further, the apparatus may or may not include the image display section. Moreover, the apparatus may or may not include the display image setting section. The sight line direction detection section may, for example, detect the direction of the user's sight line. The image display section may, for example, have an image display area where an image is displayed. The display image setting section may, for example, allow display of at least part of an image in the image display area and change, based on the detected direction of the sight line, at least one of the at least part of the image displayed in the image display area and a display position of the image displayed in the image display area. The thus configured apparatus can, for example, be achieved in the form of a head mounted display and can also be achieved in the form of another apparatus other than a head mounted display. According to the aspect described above, at least one of a variety of following results can be achieved: improvement in operability of the apparatus and simplification of the apparatus; integration of the apparatus; and improvement in convenience of the user who uses the apparatus. Part or entirety of the technical features in the aspects of the head mounted display described above is applicable to the apparatus described above.

The invention can be implemented in a variety of other aspects in addition to the head mounted display. For example, the invention can be implemented in the following aspects: a method for controlling the head mounted display; an information system including the head mounted display; a computer program for implementing the method for controlling the head mounted display and the information system; a recording medium on which the computer program is recorded; and a data signal containing the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
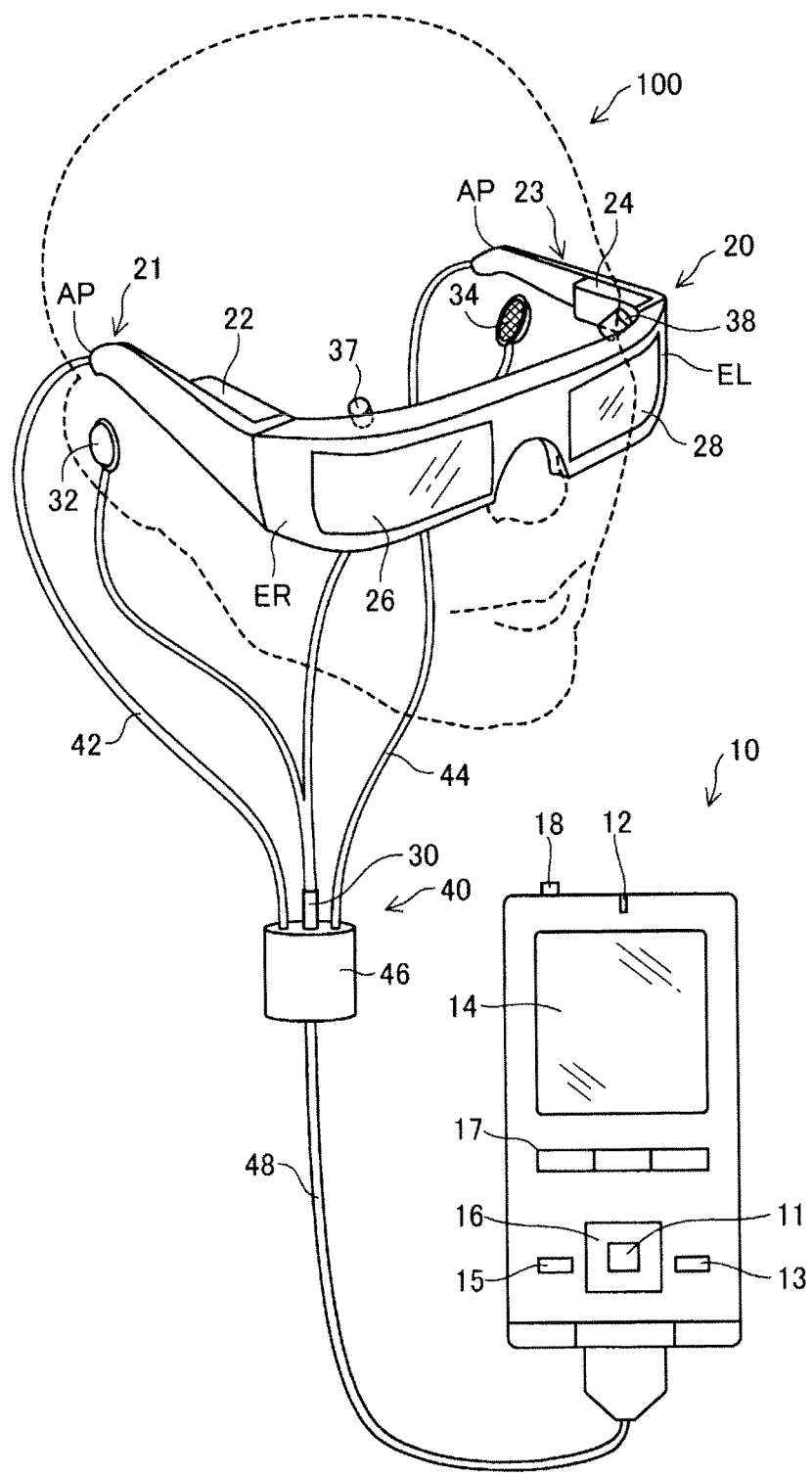
FIG. 1 is a descriptive diagram showing an exterior configuration of a head mounted display (HMD).

A-1. Configuration of Head Mounted Display:

FIG. 1 is a descriptive diagram showing an exterior configuration of a head mounted display 100 (HMD 100). HMD 100 is a display apparatus mounted on a head. The HMD 100 according to the present embodiment is an optically transmissive head mounted display that allows a user to visually recognize a virtual image and directly visually recognize an outside scene at the same time. In the present specification, the virtual image visually recognized by the user through the HMD 100 is also called a "display image" for convenience.

The HMD 100 includes an image display section 20, which is mounted on the user's head and allows the user to visually recognize a virtual image, and a control section 10 (controller 10), which controls the image display section 20.

The image display section 20 is a mountable member mounted on the user's head and has a spectacle-like shape in the present embodiment. The image display section 20 includes a right holder 21, a right display driver 22, a left holder 23, a left display driver 24, a right optical image display section 26, a left optical image display section 28, a right eye imaging camera 37, and a left eye imaging camera 38. The right optical image display section 26 and the left optical image display section 28 are so disposed that they are located in front of the right and left eyes of the user on whom the image display section 20 is mounted. One end of the right optical image display section 26 and one end of the left optical image display section 28 are connected to each other in a position corresponding to the portion between the eyes of the user on whom the image display section 20 is mounted.

The right holder 21 is a member extending from an end ER of the right optical image display section 26, which is the other end thereof, to a position corresponding to a temporal region of the user on whom the image display section 20 is mounted. Similarly, the left holder 23 is a member extending from an end EL of the left optical image display section 28, which is the other end thereof, to a position corresponding to another temporal region of the user on whom the image display section 20 is mounted. The right holder 21 and the left holder 23, which serve in the same manner as temples (bows) of spectacles do, hold the image display section 20 on the user's head.

The right display driver 22 and the left display driver 24 are disposed on opposite sides of the head of the user on whom the image display section 20 is mounted. In the following description, the right holder 21 and the left holder 23 are also simply called "holders" in a collective manner, the right display driver 22 and the left display driver 24 are also simply called "display drivers" in a collective manner, and the right optical image display section 26 and the left optical image display section 28 are also simply called "optical image display sections" in a collective manner.

The display drivers 22 and 24 include liquid crystal displays 241 and 242 (hereinafter also referred to as "LCDs 241 and 242"), projection systems 251 and 252, and other components (see FIG. 2). The configuration of the display drivers 22 and 24 will be described later in detail. The optical image display sections 26 and 28, each of which serves as an optical member, include light guide plates 261 and 262 (see FIG. 2) and light control plates. The light guide plates 261 and 262 are made, for example, of a light transmissive resin material and guide image light outputted from the display drivers 22 and 24 to the user's eyes. The light control plates are each a thin-plate-shaped optical element and are so disposed that they cover the front side of the image display section 20, which is opposite the side where the user's eyes are present. The light control plates protect the light guide plates 261 and 262 and prevent damage to the light guide plates 261 and 262, dirt from adhering thereto, and other defects from occurring. Adjustment of light transmittance of the light control plates allows adjustment of the amount of outside light incident on the user's eyes and hence adjustment of visibility of a virtual image. The light control plates can be omitted.

The right eye imaging camera 37 is a camera that captures an image of the right eye of the user on whom the image display section 20 is mounted. Similarly, the left eye imaging camera 38 is a camera that captures an image of the left eye of the user on whom the image display section 20 is mounted. An image of the user's right eye captured with the right eye imaging camera 37 and an image of the user's left eye captured with the left eye imaging camera 38 are used by a sight line direction identification section 167, which will be described later, in the process of identifying the direction of the user's sight line. Each of the right eye imaging camera 37 and the left eye imaging camera 38 is a monocular camera and may instead be a stereoscopic camera. The right eye imaging camera 37, the left eye imaging camera 38, and the sight line direction identification section 167, which will be described later, correspond to the sight line direction identification section in the appended claims. In the following description, the right eye imaging camera 37 and the left eye imaging camera 38 are also collectively called eye imaging cameras 37 and 38.

The image display section 20 further includes a connection section 40, which connects the image display section 20 to the control section 10. The connection section 40 includes a body cord 48, which is connected to the control section 10, a right cord 42, a left cord 44, and a connection member 46. The right cord 42 and the left cord 44 are two cords into which the body cord 48 bifurcates. The right cord 42 is inserted into an enclosure of the right holder 21 through a lengthwise end portion AP of the right holder 21 and connected to the right display driver 22. Similarly, the left cord 44 is inserted into an enclosure of the left holder 23 through a lengthwise end portion AP of the left holder 23 and connected to the left display driver 24. The connection member 46 is disposed at the point where the body cord 48 bifurcates into the right cord 42 and the left cord 44 and has a jack for connecting an earphone plug 30. A right earphone 32 and a left earphone 34 extend from the earphone plug 30.

The image display section 20 and the control section 10 transmit a variety of signals to each other via the connection section 40. Connectors (not shown) that engage with each other are provided at the end of the body cord 48 that is opposite the end where the connection member 46 is present and at the control section 10. Causing the connectors at the body cord 48 and the control section 10 to engage with each other or disengage from each other allows the control section 10 and the image display section 20 to be connected to each other or disconnected from each other. Each of the right cord 42, the left cord 44, and the body cord 48 can be formed, for example, of a metal cable or an optical fiber.

The control section 10 is an apparatus that controls the HMD 100. The control section 10 includes a finalizing key 11, a lighting portion 12, a display switch key 13, a trackpad 14, a luminance switch key 15, a direction key 16, menu keys 17, and a power switch 18. The finalizing key 11 detects the user's pressing operation and outputs a signal that finalizes the operation performed on the control section 10. The lighting portion 12 notifies the user of the state of action of the HMD 100 in the form of the lighting state of the lighting portion 12. An example of the state of action of the HMD 100 is whether it is powered on or off. The lighting portion 12 is formed, for example, of an LED. The display switch key 13 detects the user's pressing operation and outputs a signal that instructs, for example, switching of a content motion image display mode between 3D and 2D. The track pad 14 detects the user's finger operation on an operation surface of the track pad 14 and outputs a signal according to a result of the detection. The track pad 14 can be any of a variety of track pads based, for example, on an electrostatic method, a pressure detection method, and an optical method. The luminance switch key 15 detects the user's pressing operation and outputs a signal that increases or decreases the luminance of the image display section 20. The direction key 16 detects the user's pressing operation on a key corresponding to any of the upward, downward, rightward, and leftward directions and outputs a signal according to a result of the detection. The power switch 18 detects slide operation of the switch to switch the power on/off state of the HMD 100.

Figure 2:
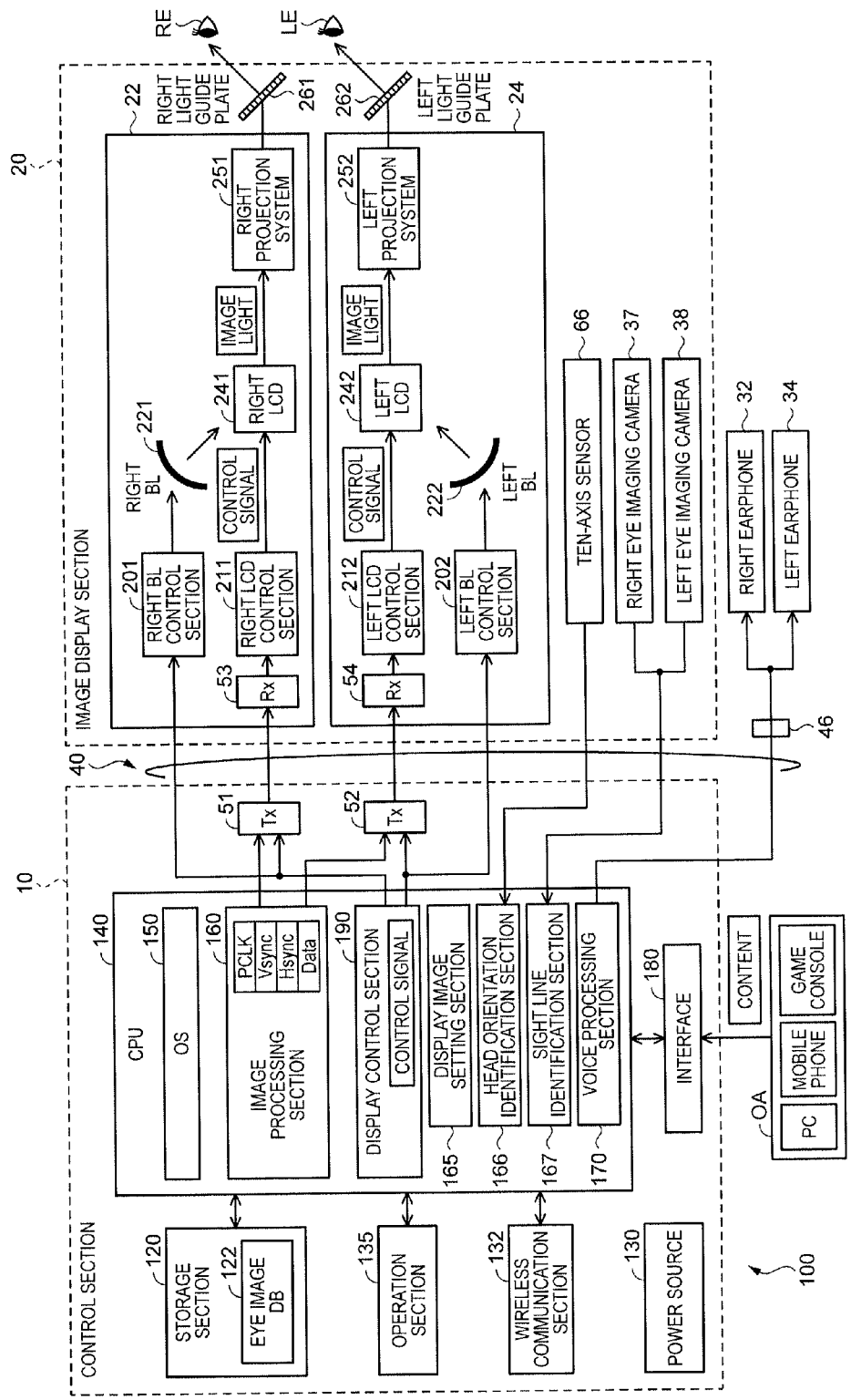
FIG. 2 is a block diagram showing the configuration of the HMD in terms of function.

FIG. 2 is a block diagram showing the configuration of the HMD 100 in terms of function. The control section 10 includes a storage section 120, a power supply 130, an operation section 135, a wireless communication section 132, a CPU 140, an interface 180, a transmitter 51 (Tx 51), and a transmitter 52 (Tx 52), as shown in FIG. 2. The operation section 135 accepts the user's operation and is formed of the finalizing key 11, the display switch key 13, the trackpad 14, the luminance switch key 15, the direction key 16, the menu keys 17, and the power switch 18.

The power supply 130 supplies the portions in the HMD 100 with electric power. The power supply 130 can, for example, be a secondary battery. The wireless communication section 132 performs wireless communication with a content server, a television, a personal computer, and other apparatus in compliance with a predetermined wireless communication standard, such as a wireless LAN and Bluetooth.

The storage section 120 stores a variety of computer programs. The storage section1 120 is formed of a ROM, a RAM, and other devices. The storage section1 120 has an eye image DB 122, which stores a plurality of images related to directions of the user's sight line. The eye image DB 122 stores, for example, an image of a right eye RE and an image of a left eye LE in a case where the direction of the sight line is the rightward direction, as the images related to directions of the user's sight line. The eye image DB 122 corresponds to the eye image storage section in the appended claims.

Figures 3, 4:
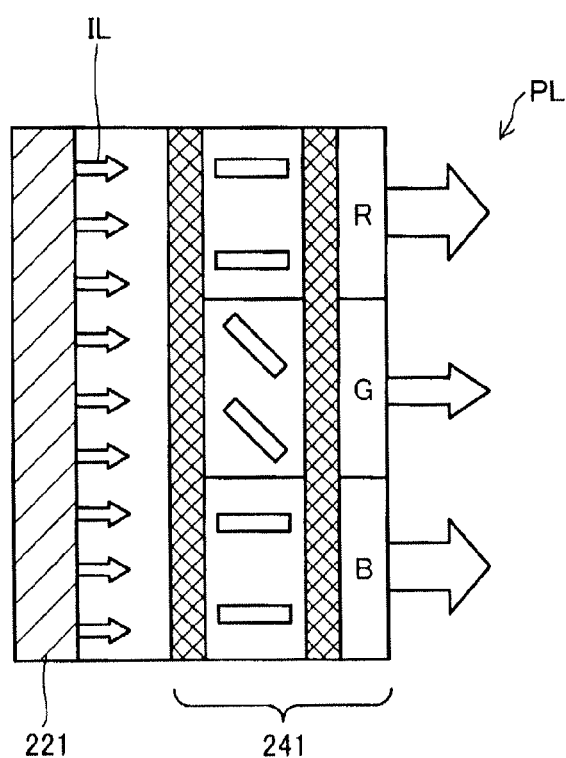
FIG. 3 is a descriptive diagram showing an example of an image of a right eye related to the direction of a user's sight line and stored in an eye image DB.
FIG. 4 is a descriptive diagram showing how an image light generation unit emits image light.

FIG. 3 is a descriptive diagram showing an example of an image of the right eye RE related to the direction of the user's sight line and stored in the eye image DB 122. FIG. 3 shows images of the right eye RE in cases where the sight line of the user's right eye RE is oriented frontward, rightward, leftward, upward, and downward. The five images of the user's right eye RE shown in FIG. 3 are images of the user's right eye RE captured in advance with the right eye imaging camera 37. The sight line direction identification section 167, which will be described later, compares an image of the user's right eye RE captured with the right eye imaging camera 37 with the images of the user's right eye RE related to the sight lines to identify the direction of the user's sight line.

The CPU 140 reads and executes the computer programs stored in the storage section 120 to function as an operating system 150 (OS 150), a display control section 190, a voice processing section 170, an image processing section 160, ahead orientation identification section 166, the sight line direction identification section 167, and a display image setting section 165.

The display control section 190 produces control signals that control the right display driver 22 and the left display driver 24. Specifically, the display control section 190 separately controls, with the aid of the control signals, a right LCD control section 211 to cause it to drive the right LCD 241 or not, controls a right backlight control section 201 to cause it to drive a right backlight 221 or not, controls a left LCD control section 212 to cause it to drive the left LCD 242 or not, controls a left backlight control section 202 to cause it to drive a left backlight 222 or not, and performs other types of control. The display control section 190 thus controls each of the right display driver 22 and the left display driver 24 to cause it to generate and output image light. For example, the display control section 190 causes both the right display driver 22 and the left display driver 24 to generate image light, only one of them to generate image light, or neither of them to generate image light. Generating image light is also referred to as "displaying an image."

The display control section 190 transmits the control signals to the right LCD control section 211 and the left LCD control section 212 via the transmitters 51 and 52, respectively. The display control section 190 further transmits the control signals to the right backlight control section 201 and the left backlight control section 202.

The image processing section 160 acquires an image signal contained in a content. The image processing section 160 separates a vertical sync signal VSync, a horizontal sync signal HSync, and other sync signals from the acquired image signal. Further, the image processing section 160 produces a clock signal PCLK by using a PLL (phase locked loop) circuit or any other circuit (not shown) in accordance with the cycles of the separated vertical sync signal VSync and horizontal sync signal HSync. The image processing section 160 converts the analog image signal from which the sync signals have been separated into a digital image signal by using an A/D conversion circuit and other circuits (not shown). The image processing section 160 stores the converted digital image signal as image data on a target image (RGB Data) in a DRAM in the storage section 120 on a frame basis. The image processing section 160 may perform, as required, resolution conversion, luminance adjustment, chroma adjustment, and a variety of other types of color correction, keystone correction, and other types of image processing on the image data.

The image processing section 160 transmits the produced clock signal PCLK, vertical sync signal VSync, horizontal sync signal HSync, and the image data stored in the DRAM in the storage section 120 via the transmitters 51 and 52. The image data transmitted via the transmitter 51 is also called "image data for the right eye," and the image data transmitted via the transmitter 52 is also called "image data for the left eye." Each of the transmitters 51 and 52 functions as a transceiver that performs serial transmission between the control section 10 and the image display section 20.

The voice processing section 170 acquires a voice signal contained in a content, amplifies the acquired voice signal, and supplies the amplified voice signal to a loudspeaker (not shown) in the right earphone 32 and a loudspeaker (not shown) in the left earphone 34, which are connected to the connection member 46. For example, when a Dolby (registered trademark) system is employed, relevant processing is performed on the voice signal, and the right earphone 32 and the left earphone 34 output sounds differentiated in terms, for example, of frequency.

The head orientation identification section 166 identifies the orientation of the user's head based on angular velocity detected with a ten-axis sensor 66 mounted on the image display section 20, which will be described later. The head orientation identification section 166 identifies the head orientation at the current point of time with reference to the head orientation at the point of time when the ten-axis sensor 66 starts detecting the angular velocity. The head orientation identification section 166 transmits information on the identified orientation of the head to the sight line direction identification section 167. The ten-axis sensor 66 and the head orientation identification section 166 correspond to the head orientation detection section in the appended claims.

The sight line direction identification section 167 compares images of the user's right and left eyes RE, LE captured with the eye imaging cameras 37 and 38 with the images of the right and left eyes RE, LE related to the user's sight lines and stored in the eye image DB 122 to identify the user's sight line. More specifically, the sight line direction identification section 167 performs a pattern matching or statistic discrimination method on the captured images and the images stored in the eye image DB 122 to determine which of the frontward, rightward, leftward, upward, and downward directions the user's sight line is oriented in.

The display image setting section 165 sets an image to be displayed in the image display section 20 based on the identified orientation of the user's head and the identified direction of the user's sight line. In the present embodiment, the size of an image based on the image data stored on a frame basis in the DRAM in the storage section 120 is greater than the size of the largest image displayed in the image display section 20. The display image setting section 165 therefore selects part of the image data stored in the DRAM based on the direction of the sight line and sets the selected image data to be image data to be transmitted to the image display section 20. The display image setting section 165 then transmits the thus set image data to the image display section 20 via the transmitters 51 and 52. In other words, the display image setting section 165 causes the image display section 20 to display part of the image based on the image data stored in the DRAM. The display image setting section 165 does not need to display an image all over an image display maximum area PN, which is the largest area where an image can be displayed in the image display section 20 and may instead display an image in part of the image display maximum area PN. Further, the image data stored in the DRAM may instead be image data representing images that are a mixture of a plurality of image data sets representing completely different images. The relationship between the direction of the sight line and a display image displayed in the image display section 20 will be described in detail in the procedure of a display image setting process, which will be described later. It is noted at present that the display image setting section 165 changes, in correspondence with a change in the direction of the sight line, the data stored in the DRAM to image data to be transmitted to the image display section 20 via the transmitters 51 and 52. The image display maximum area PN corresponds to the image display area in the appended claims.

The interface 180 connects a variety of external apparatus OA, which are content supply sources, to the control section 10. Examples of the external apparatus OA may include a personal computer (PC), a mobile phone terminal, and a game console. The interface 180 can, for example, be a USB interface, a micro-USB interface, and a memory card interface.

The image display section 20 includes the right display driver 22, the left display driver 24, the right light guide plate 261 as the right optical image display section 26, the left light guide plate 262 as the left optical image display section 28, the right eye imaging camera 37, the left eye imaging camera 38, and the ten-axis sensor 66.

The right display driver 22 includes a receiver 53 (Rx 53), the right backlight control section 201 (right BL control section 201) and the right backlight 221 (right BL 221), which function as a light source, the right LCD control section 211 and the right LCD 241, which function as a display device, and the right projection system 251. The right backlight control section 201 and the right backlight 221 function as a light source. The right LCD control section 211 and the right LCD 241 function as a display device. The right backlight control section 201, the right LCD control section 211, the right backlight 221, and the right LCD 241 are also collectively called an "image light generation unit."

The receiver 53 functions as a receiver for serial transmission between the control section 10 and the image display section 20. The right backlight control section 201 drives the right backlight 221 based on an inputted control signal. The right backlight 221 is a light emitter, for example, an LED or an electro-luminescence (EL) device. The right LCD control section 211 drives the right LCD 241 based on the clock signal PCLK, the vertical sync signal VSync, the horizontal sync signal HSync, and the image data for the right eye inputted via the receiver 53. The right LCD 241 is a transmissive liquid crystal panel having a plurality of pixels arranged in a matrix.

The right projection system 251 is formed of a collimator lens that converts the image light outputted from the right LCD 241 into a parallelized light flux. The right light guide plate 261 as the right optical image display section 26 reflects the image light outputted through the right projection system 251 along a predetermined optical path and guides the image light to the user's right eye RE. The right projection system 251 and the right light guide plate 261 are also collectively called a "light guide unit."

The left display driver 24 has the same configuration as that of the right display driver 22. The left display driver 24 includes a receiver 54 (Rx 54), the left backlight control section 202 (left BL control section 202) and the left backlight 222 (left BL 222), which function as a light source, the left LCD control section 212 and the left LCD 242, which function as a display device, and the left projection system 252. The left backlight control section 202 and the left backlight 222 function as a light source. The left LCD control section 212 and the left LCD 242 function as a display device. The left backlight control section 202, the left LCD control section 212, the left backlight 222, and the left LCD 242 are also collectively called an "image light generation unit." The left projection system 252 is formed of a collimator lens that converts the image light outputted from the left LCD 242 into a parallelized light flux. The left light guide plate 262 as the left optical image display section 28 reflects the image light outputted through the left projection system 252 along a predetermined optical path and guides the image light to the user's left eye LE. The left projection system 252 and the left light guide plate 262 are also collectively called a "light guide unit."

The right eye imaging camera 37 captures an image of the user's right eye RE. Similarly, the left eye imaging camera 38 captures an image of the user's left eye LE. The ten-axis sensor 66 is a sensor that detects acceleration (three axes), angular velocity (three axes), geomagnetism (three axes), and atmospheric pressure (one axis). The ten-axis sensor 66, which is built in the image display section 20 and in the vicinity of the right display driver 22, detects the motion and position of the user's head on which the image display section 20 is mounted. In the present embodiment, the ten-axis sensor 66, which detects geomagnetism and other quantities for identifying the orientation of the user's head, whereas in another embodiment, the ten-axis sensor 66 may be replaced with a gyro sensor that detects only angular velocity (three axes).

FIG. 4 is a descriptive diagram showing how each of the image light generation units outputs image light. The right LCD 241 drives the liquid crystal material in the position of each of the pixels arranged in a matrix to change the transmittance at which the right LCD 241 transmits light so as to modulate illumination light IL radiated from the right backlight 221 into effective image light PL representing an image. The same holds true for the left side. The backlight-based configuration is employed in the present embodiment as shown in FIG. 4, but a front-light-based configuration or a configuration in which image light is outputted based on reflection may be used.

Figure 5:
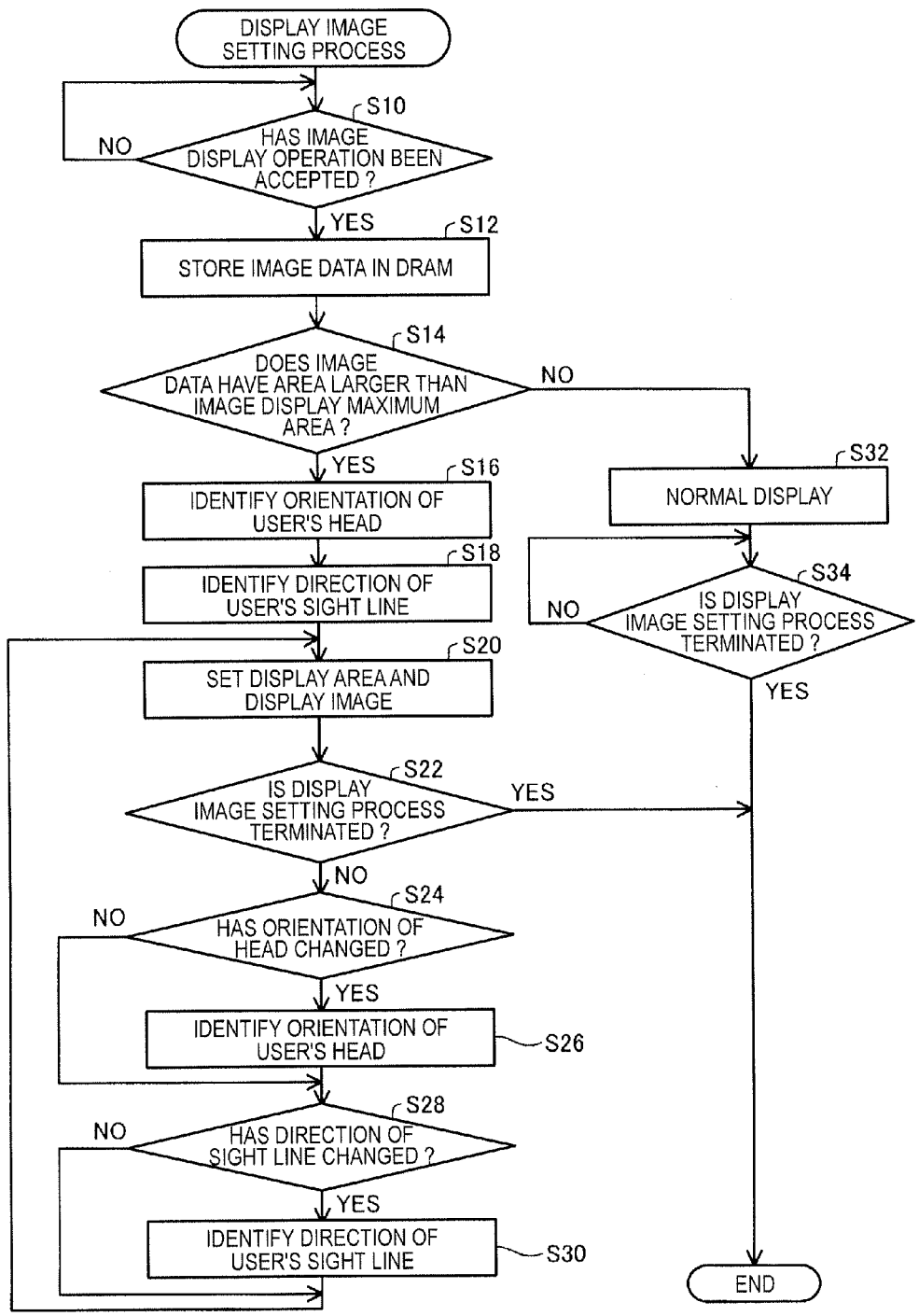
FIG. 5 is a flowchart of a display image setting process.

A-2. Display Image Setting Process:

FIG. 5 is a flowchart of the display image setting process. In the display image setting process, the control section 10 sets an image that the image display section 20 is caused to display in correspondence with an identified direction of the sight line. The operation section 135 first evaluates whether it has accepted operation of causing the image display section 20 to display an image of a content (step S10). When a result of the evaluation shows that no image display operation has been accepted (step S10: NO), the operation section 135 keeps waiting for acceptance of the image display operation (step S10). When a result of the evaluation shows that the image display operation has been accepted (step S10: YES), the image processing section 160 stores image data on a content according to the operation in the DRAM in the storage section 120 (step S12).

The display image setting section 165 then evaluates whether or not the image data stored in the DRAM (hereinafter also simply referred to as "stored data") has an area larger than the image display maximum area PN of the image display section 20 (step S14). When a result of the evaluation shows that the stored data has an area larger than the image display maximum area PN (step S14: YES), the head orientation identification section 166 identifies the orientation of the user's head by using the angular velocity detected with the ten-axis sensor 66 (step S16). The sight line direction identification section 167 compares images of the right and left eyes RE, LE captured with the eye imaging cameras 37 and 38 with the images stored in the eye image DB 122 to identify the user's sight line oriented in one of the frontward, rightward, leftward, upward, and downward directions (FIG. 3) (step S18). The display image setting section 165 selects data on an image of an area related to the identified direction of the sight line from the stored data, sets an image based on the selected image data, and allows display of the set image in the image display maximum area PN (step S20).

Figures 6, 7:
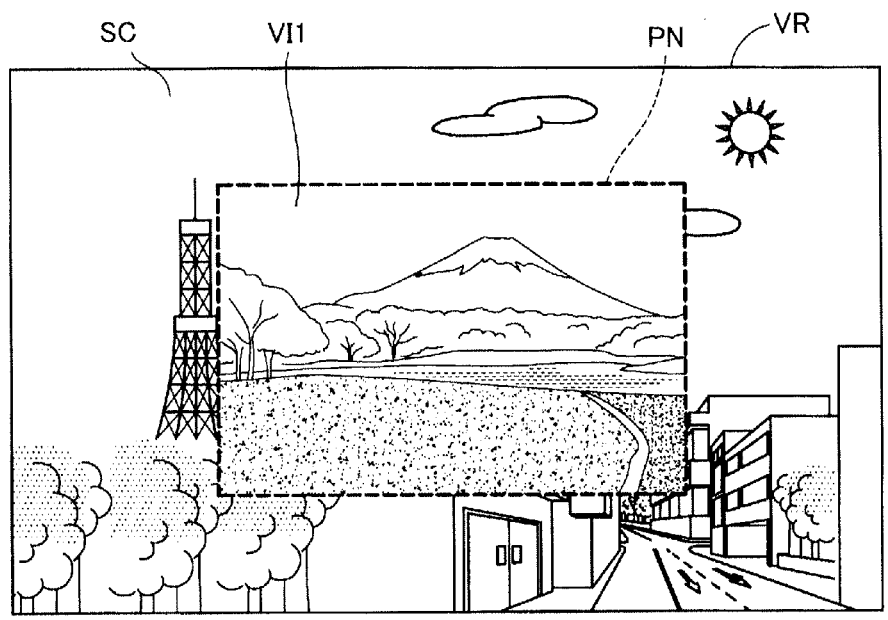
FIG. 6 is a descriptive diagram showing an example of the relationship between identified directions of a sight line and image data areas related to the directions of the sight line.
FIG. 7 is a descriptive diagram showing an example of a field of view visually recognized by the user when an image is displayed in an image display maximum area.

FIG. 6 is a descriptive diagram showing an example of the relationship between identified directions of the sight line and image data areas related to the directions of the sight line. FIG. 6 shows the relationship in the form of a table showing image data related areas related to identified directions of the sight line and displayed in the image display maximum area PN. The field for the image data related areas in the table is separated into two portions. The upper portion of the separated field for the image data related areas shows characters representing the position of each of the image data related areas where an image is displayed. The lower portion of the separated field for the image data related areas shows each of the image data related areas displayed in the image display maximum area PN not only with the outer frame of the image data related area drawn with a solid line against the outer frame of the stored data drawn with a dashed line but also with the interior of the image data related area hatched. In the example shown in FIG. 6, each of the image data related areas is formed of 4 of 16 divided portions obtained by dividing the entire stored data by 4 in the horizontal and vertical directions. As shown in the lower portion of the field for the image data related areas in FIG. 6, different image data related areas share part of the stored data formed of the 16 divided portions in some cases. For example, the central image data related area and the right image data related area share 2 of the 16 divided portions of the stored data. In the present embodiment, in the process of step S20 in FIG. 5, four of the 16 divided portions, that is, the upper right portion, the lower right portion, the upper left portion, and the lower left portion, are not displayed in the image display maximum area PN. As will be described later, any of the four portions described above is displayed, when the orientation of the user's head changes, in accordance with the combination of the orientation of the user's head and the direction of the user's sight line.

FIG. 7 is a descriptive diagram showing an example of a field of view VR visually recognized by the user when an image is displayed in the image display maximum area PN. As shown in FIG. 7, the user not only visually recognizes an outside scene SC through the optical image display sections 26 and 28 but also visually recognizes a display image VI1 displayed in the image display maximum area PN. When the direction of the user's sight line is identified as the frontward direction, the display image VI1 is an image displayed in the image display maximum area PN based on the central image data related area of the stored data. In the present embodiment, the display image VI1 is an image based on image data on a stationary image, whereas in another embodiment, the display image VI1 may be an image based on image data on motion images instead of a stationary image. In FIG. 7, the outer frame of the image display maximum area PN is drawn with a broken line for convenience, but no outer frame of the image display maximum area PN is actually displayed. In the example shown in FIG. 7, the display image VI1 is displayed all over the image display maximum area PN, whereas in another embodiment, an image based on the stored data may be displayed in part of the image display maximum area PN.

After the process of step S20 in FIG. 5 is carried out, the control section 10 evaluates whether or not the operation section 135 has detected acceptance of operation of terminating the display image setting process (step S22). When a result of the evaluation shows that the operation section 135 has detected no operation of terminating the display image setting process (step S22: NO), the head orientation identification section 166 evaluates whether or not the orientation of the user's head has changed by an angle greater than or equal to a predetermined threshold (step S24). In the present embodiment, the threshold is set at 10 degrees in advance. Therefore, when the orientation of the user's head has turned rightward by 10 degrees or greater, the head orientation identification section 166 determines that the orientation of the head has changed rightward. In another embodiment, the threshold may be set at a different value in advance. When a result of the evaluation in the process of step S24 shows that the orientation of the user's head has changed (step S24: YES), the head orientation identification section 166 identifies the orientation of the user's head (step S26). Specifically, the head orientation identification section 166 assumes that the orientation of the head before any change is frontward and determines that the orientation of the head has changed to any of the rightward, leftward, upward, and downward directions, as in the case of the direction of the user's sight line.

When the orientation of the user's head is identified or a result of the evaluation in the process in step S24 shows that the orientation of the user's head has not changed (step S24: NO), the sight line direction identification section 167 evaluates whether or not the direction of the user's sight line has changed (step S28). When a result of the evaluation shows that the direction of the user's sight line has changed (step S28: YES), the sight line direction identification section 167 identifies the direction of the user's sight line that has been changed (step S30). When the direction of the user's sight line is identified or a result of the evaluation in the process of step S28 shows that the direction of the user's sight line has not changed (step S28: NO), the display image setting section 165 selects data on an image of an area related to the orientation of the user's head and the direction of the user's sight line from the stored data, sets an image based on the selected image data, and allows display of the set image in the image display maximum area PN (step S20). When image data from the stored data and on an image of an area displayed in the image display maximum area PN changes, the display image setting section 165 gradually changes the image displayed in the image display maximum area PN from an image before the change to an image after the change. For example, when it takes 0.1 seconds for the orientation of the user's head and the direction of the user's sight line to change, the display image setting section 165 changes the image in such a way that the changes takes 0.5 seconds. When neither the orientation of the user's head nor the direction of the user's sight line has changed, the display image setting section 165 displays the same image in the image display maximum area PN.

Figure 8:
FIG. 8 is a descriptive diagram showing an example of the relationship of the combination of an identified orientation of the head after a change and an identified direction of the sight line after a change with image data areas.

FIG. 8 is a descriptive diagram showing an example of the relationship of the combination of then identified orientation of the head after a change and an identified direction of the sight line after a change with image data areas. FIG. 8 shows the relationship in the form of a table showing image data related areas related to the combination of the orientation of the user's head after a change and the direction of the user's sight line after a change and displayed in the image display maximum area PN. For example, when the orientation of the user's head has not changed (no change in FIG. 8) and the direction of the user's sight line is the leftward direction, the image data related area is formed of four portions located in the central portion in the upward/downward direction and on the left in the rightward/leftward direction, as shown in FIG. 8. When the orientation of the user's head has changed to the leftward direction and the direction of the user's sight line is the downward direction, the image data related area is formed of four portions located at the lower left portion of the image data. In the present embodiment, the orientation of the head after a change is classified into the four directions, the rightward, leftward, upward, and downward directions, whereas in another embodiment, the orientation of the head after a change may instead be classified into the upward, rightward direction and other directions. In the present embodiment, the angular threshold in accordance with which it is detected that the orientation of the user's head has been changed is 10 degrees as described above. Therefore, when the user's head has been determined to be oriented leftward and the orientation of the head changes rightward by at least 20 degrees, which is twice 10 degrees, the head orientation identification section 166 determines that the orientation of the head has changed from left to right.

Figure 9:
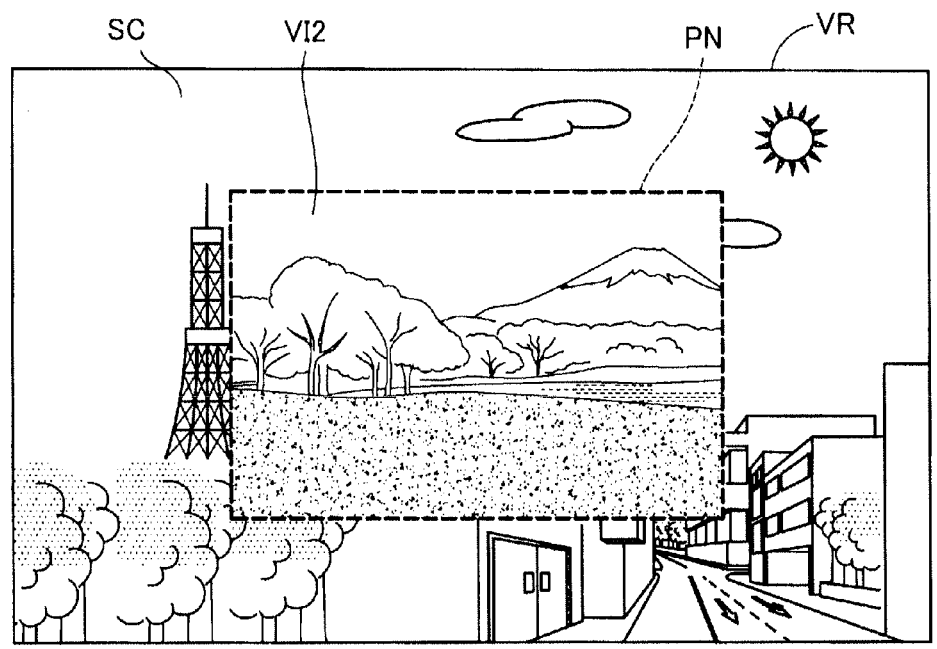
FIG. 9 is a descriptive diagram showing an example of the field of view visually recognized by the user after the direction of the sight line changes.

FIG. 9 is a descriptive diagram showing an example of the field of view VR visually recognized by the user after the direction of the sight line changes. FIG. 9 shows the field of view VR in a state in which after the direction of the user's sight line has changed to the leftward direction with no change in the orientation of the user's head, a display image VI2 is displayed in the image display maximum area PN. Since the orientation of the user's head has not changed, the outside scene SC is the same as the outside scene SC shown in FIG. 7. On the other hand, since the direction of the user's sight line has changed to the leftward direction with respect to the state shown in FIG. 7, the display image VI2 displayed in the image display maximum area PN is an image still based on part of the stored data but left-side image data thereof.

When the process of step S20 in FIG. 5 is carried out, the control section 10 carries out the processes of step S22 and the following steps again. When a result of the evaluation in the process of step S22 shows that the operation section 135 has detected acceptance of operation of terminating the display image setting process (step S22: YES), the control section 10 terminates the display image setting process.

When a result of the evaluation in the process of step S14 does not show that the stored data has an area larger than the image display maximum area PN (step S14: NO), the display image setting section 165 can display the entire stored data in the image display maximum area PN. The display image setting section 165 therefore normally allows display of an image based on the entire stored data in the image display maximum area PN (step S32). The control section 10 then evaluates whether or not the operation section 135 has detected acceptance of operation of terminating the display image setting process (step S34), as in step S22. When a result of the evaluation shows that the operation section 135 has not detected operation of terminating the display image setting process (step S34: NO), the control section 10 keeps allowing display of an image in the image display maximum area PN and monitors whether the operation section 135 has detected acceptance of the operation of terminating the display image setting process (step S34). When a result of the evaluation shows that the operation section 135 has detected acceptance of the operation of terminating the display image setting process (step S34: YES), the control section 10 terminates the display image setting process.

As described above, in the HMD 100 according to the present embodiment, the sight line direction identification section 167 uses images of the user's right and left eyes RE, LE captured with the eye imaging cameras 37 and 38 to identify the direction of the user's sight line. The display image setting section 165 sets image data that is part of the stored data and related to the identified direction of the user's sight line and allows display of the set image data in the image display maximum area PN of the image display section 20. In the HMD 100 according to the present embodiment, the image that can be visually recognized by the user therefore changes in accordance with the direction of the user's sight line. Therefore, even though the image display maximum area PN, where the image display section 20 can display an image, has a limited size, the user can change the direction of the sight line to practically visually recognize a screen larger than the size displayable in the image display maximum area PN, whereby the convenience of the user is improved.

Further, in the HMD 100 according to the present embodiment, even when an area related to image data set in the stored data differs from an area related to another image data set in the stored data, the two sets of image data partially overlap with each other, and the display image setting section 165 sets an image based on the image data associated with an image data related area related to the direction of the user's sight line and allows display of the set image in the image display maximum area PN of the image display section 20. Therefore, in the HMD 100 according to the present embodiment, even when the display image changes in correspondence with a change in the direction of the user's sight line, at least part of the same image is displayed before and after the change, and the user can therefore recognize the positional relationship between the display images before and after the change, whereby the convenience of the user is further improved.

Further, in the HMD 100 according to the present embodiment, the stored data is image data on stationary images, and the display image setting section 165 sets, as an image to be displayed in the image display maximum area PN, an image associated with one of the following 9 image data related areas (FIG. 8): central; right; left; upper; lower; upper right; lower right; upper left; and lower left image data related areas in correspondence with the five types of change in the direction of the sight line and the five types of change in the orientation of the head. Therefore, in the HMD 100 according to the present embodiment, the limited types of image are displayed in the image display maximum area PN, which means that the user can recognize which direction of the sight line and which orientation of the head the currently displayed image is related to, and the user can recognize which direction of the sight line and which orientation of the head the current direction and orientation should be changed to in order to display an image that the user desires to visually recognize next, whereby the convenience of the user is further improved.

Further, in the HMD 100 according to the present embodiment, when the image data that is part of the stored data and associated with an area displayed in the image display maximum area PN changes, the display image setting section 165 gradually changes an image displayed in the image display maximum area PN from an image before the change to an image after the change. Therefore, in the HMD 100 according to the present embodiment, the image displayed in the image display maximum area PN is not switched to another instantaneously in response to a change in the direction of the user's sight line, whereby a burden on the user's eyes can be reduced.

Further, in the HMD 100 according to the present embodiment, the eye image DB 122 in the storage section 120 stores, as images related to the direction of the user's sight line, images of the right and left eyes RE, LE, for example, in a case where the sight line is oriented rightward (FIG. 3). Further, the sight line direction identification section 167 compares images of the user's right and left eyes RE, LE captured with the eye imaging cameras 37 and 38 with the images stored in the eye image DB 122 to identify the direction of the user's sight line. The HMD 100 according to the present embodiment therefore readily allows identification of the direction of the user's sight line.

Further, in the HMD 100 according to the present embodiment, the display image setting section 165 sets an image to be displayed in the image display maximum area PN of the image display section 20 based on the orientation of the user's head and the direction of the user's sight line. In the thus configured HMD 100 according to the present embodiment, since the image visually recognized by the user changes in accordance with the combination of the orientation of the user's head and the direction of the user's sight line, the user can visually recognize a variety of images by changing the orientation of the head and the direction of the sight line even though the image display maximum area PN has a limited size.

B. Second Embodiment

A second embodiment differs from the first embodiment in that the image data stored in the DRAM in the storage section 120 is formed of motion images and the image data transmitted from the store data to the image display section 20 is set based only on the direction of the user's sight line, and the second embodiment is the same as the first embodiment in terms of the other configurations and control items.

In the second embodiment, since the image displayed in the image display section 20 is formed of motion images, the sight line direction identification section 167 identifies the direction of the user's sight line based on the angle of convergence made by the user's eyes, unlike in the first embodiment. The display image setting section 165 selects and sets image data on an image to be displayed in the image display section 20 from the stored data in correspondence with the identified direction of the user's sight line.

Figure 10:
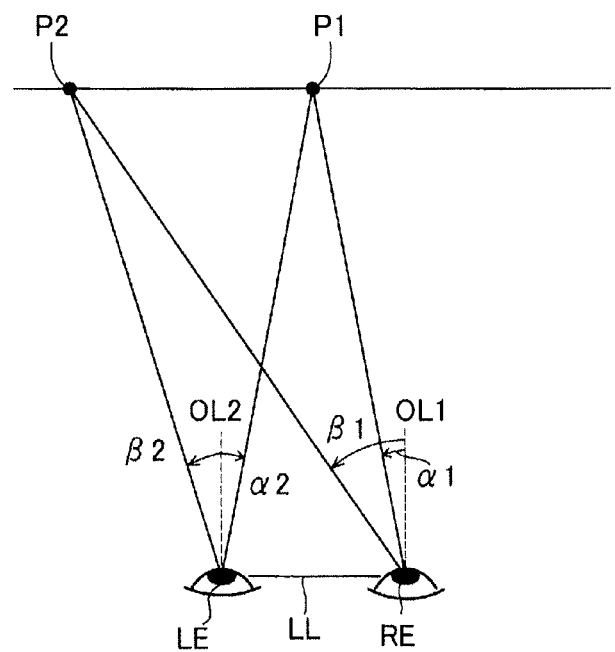
FIG. 10 is a descriptive diagram of the angle of convergence of the user.

FIG. 10 is a descriptive diagram of the angle of convergence of the user. FIG. 10 shows the angle of convergence in a case where the user fixes the eyes on a point P1 and the angle of convergence in a case where the user fixes the eyes on a point P2. Let a straight line LL be a straight line that connects the center of the user's right eye RE and the center of the user's left eye LE to each other, and define a straight line OL1 perpendicular to the straight line LL, parallel to the horizontal direction, and passing through the center of the right eye RE and a straight line OL2 perpendicular to the straight line LL, parallel to the horizontal direction, and passing through the center of the left eye LE. In this case, the angle of convergence in the case where the user fixes the eyes on the point P1 is calculated by adding an angle α1 between the straight line that connects the center of the right eye RE to the point P1 and the straight line OL1 and an angle α2 between the straight line that connects the center of the left eye LE to the point P1 and the straight line OL2 to each other. Similarly, the angle of convergence in the case where the user fixes the eyes on the point P2 is calculated by subtracting an angle β2 between the straight line that connects the center of the left eye LE to the point P2 and the straight line OL2 from an angle β1 between the straight line that connects the center of the right eye RE to the point P2 and the straight line OL1.

In the second embodiment, before the display image setting process is carried out, the display image setting section 165 allows display of a plurality of virtual points in the image display maximum area PN in advance, and the eye image DB 122 in the storage section 120 stores images of the user's eyes fixed on the virtual points. The sight line direction identification section 167 then compares captured images of the user's right and left eyes RE, LE with the images of the user's eyes stored in the eye image DB 122 to identify the angle of convergence and the angles α1 and α2 for identification of the direction of the user's sight line. The sight line direction identification section 167 having identified the angle of convergence can measure the distance from the user to the position on which the user fixes the eyes.

The display image setting section 165 causes the image display section 20 to display an image based on image data selected from the stored data in correspondence with the identified direction of the user's sight line. For example, to display an image based on the entire stored data in a case where the direction of the user's sight line needs to change rightward and leftward by 30 degrees and upward and downward by 15 degrees, the display image setting section 165 causes the image display section 20 to display an image related to the range described above in one-to-one correspondence. When the direction of the user's sight line changes leftward by 10 degrees and upward by 5 degrees from frontward, the display image setting section 165 causes the image display section 20 to display an image centered around a position shifted from the center of the stored data related area by 10 degrees leftward and 5 degrees upward. If the direction of the user's sight line changes leftward by 35 degrees, which is greater than 30 degrees, which is an upper limit of the leftward angular change, and changes upward by 5 degrees, the display image setting section 165 causes the image display section 20 to display an image centered around a position shifted from the center of the stored data related area leftward by 30 degrees, which is the limit of the leftward angular change, and upward by 5 degrees. In another embodiment, the display image setting section 165 may instead cause the image display section 20 to display an image centered around a position shifted from the center of the stored data related area leftward by 35 degrees and upward by 5 degrees with no image displayed in a portion corresponding to the 5 degrees in a right portion of the image display maximum area PN. When an image based on the entire stored image exceeds the upper limit to which the user is allowed to change the direction of the sight line (250 degrees rightward and leftward, for example), the display image setting section 165 may set the image based on the entire stored data in such a way that the center of the stored data related area changes by 2 degrees when the direction of the user's sight line changes by 1 degree so that the image can be displayed in correspondence with the change in the direction of the user's sight line. In the HMD 100 according to the second embodiment, when an image to be displayed in the image display section 20 based on the stored data is formed of motion images, the display image setting section 165 sets an image data related area selected from the stored data in correspondence with an identified direction of the user's sight line in one-to-one correspondence. The HMD 100 according to the second embodiment can therefore change the area of the display image in correspondence with a slight change in the direction of the sight line, whereby the convenience of the user is improved.

C. Variations

The invention is not limited to the embodiments described above and can be implemented in a variety of aspects to the extent that they do not depart from the substance of the invention. For example, the following variations are conceivable.

C-1. Variation 1

In the embodiments described above, the description has been made of the aspect in which an image is displayed all over the image display maximum area PN of the image display section 20, but an image is not necessarily displayed allover the image display maximum area PN. The relationship between the image display maximum area PN and a display image can be changed in a variety of ways. For example, the display image setting section 165 may set the size of an image displayed in the image display maximum area PN in accordance, for example, with operation accepted by the operation section 135. Further, when an image is displayed in part of the image display maximum area PN, the display image setting section 165 may change the position of the image displayed in the image display maximum area PN in accordance with a change in the direction of the user's sight line or the orientation of the user's head. Specifically, consider a case where the user's sight line is oriented frontward; the image display maximum area PN is divided by two both in the vertical and horizontal directions into four areas in total; an image is displayed in the upper left area; and the direction of the user's sight line changes to the upward, leftward direction. In this case, the display image setting section 165 may enlarge the image displayed in the upper left area of the image display maximum area PN before the direction of the sight line changes and displays the image all over the image display maximum area PN. Further, consider a case where the user's sight line is oriented frontward; an image is displayed in part of a central portion of the image display maximum area PN; and the direction of the user's sight line changes to the leftward direction. In this case, the display image setting section 165 may shift the display image to a left portion of the image display maximum area PN to follow the direction of the sight line. In this process, the display image setting section 165 may not change the area selected from the stored data or may change the selected area to a left area.

Further, in the embodiments described above, the HMD 100, which projects a virtual image, is used. Instead, an HMD based on a MEMS (micro electro-mechanical system) optical scanner may be used. In a MEMS-based HMD, in which one mirror changes the position where image light is projected on a single pixel basis or one mirror or multiple mirrors change the position where image light is projected on a multiple pixel (3×3 pixels, for example) basis, the area where an image is displayed varies depending on the orientation of the mirror or the mirrors. When the MEMS-based HMD is used, the image display area in the appended claims refers to an entire area over which an image can be displayed by the mirror or the mirrors that change the orientation thereof. For example, when there are two image displayable areas, an area D1 and an area D2, depending on the orientation of the mirror or the mirrors, the image display area is the entire area in the area D1 or D2.

The stored data in the DRAM in the storage section 120 may be images that are a mixture of a plurality of image data sets. For example, to compare two different restaurants with each other, when the direction of the user's sight line has changed to the rightward direction, the display image setting section 165 may allow display of an image of a menu or any other object associated with one of the restaurants all over the image display maximum area PN, whereas when the direction of the user's sight line has changed to the leftward direction, the display image setting section 165 may allow display of an image of a menu or any other object associated with the other restaurant all over the image display maximum area PN.

When the user's sight line is oriented frontward, the display image setting section 165 may not cause an image to be displayed in a central area of the image display maximum area PN but may cause an image to be displayed in an area other than the central area of the image display maximum area PN. Thereafter, when the direction of the user's sight line changes to a direction other than the frontward direction, the display image setting section 165 may cause an image related to an image data related area corresponding to the direction of the sight line after the change to be displayed all over the image display maximum area PN. In the variation, when the user's sight line is oriented frontward, it is determined that the user desires to visually recognize an outside scene, and an image is displayed in an area other than the central portion of the image display maximum area PN. The user can therefore visually recognize the outside scene or the image that the user desires to visually recognize only by changing the direction of the sight line, whereby the convenience of the user is improved. The central area of the image display maximum area PN can, for example, be central 4 portions of the 16 portions obtained by dividing the image display maximum area PN, as the stored data is divided as shown in FIGS. 6 and 8. Further, when the user faces frontward, the central area of the image display maximum area PN may be an area set based on the field of view of the user, such as what is called an effective field of view (area within about 30 degrees in the horizontal direction and about 20 degrees in the vertical direction).

When the stored data is a mixture of image data on motion images and image data on stationary images, the display image setting section 165 may change, in accordance with which of the image data sets based on which images are displayed in the image display maximum area PN is used, the setting of the speed at which the images change after the user's sight line changes. For example, the display image setting section 165, after causing the image display section 20 to display stationary images classified into several areas, as in the first embodiment, and when changing the display image, lowers the speed at which the images change as compared with the speed at which the direction of the sight line changes. On the other hand, the display image setting section 165, when causing the image display section 20 to display motion images accompanied by the change in the area of the display image in one-to-one correspondence as in the second embodiment, may set the speed at which the images change to be equal to the speed at which the direction of the sight line changes. In the variation, since the speed of the change in images displayed in the image display maximum area PN changes in accordance with whether the images based on the stationary image data or the images based on the motion image data are used, the user can recognize whether the display image is formed of stationary images or motion images based on the speed at which the images change. The stored data does not change with time when the data is formed of stationary images, whereas the stored data changes with time when the data is formed of motion images. Therefore, when a case where a display image based on stationary images changes is compared with a case where a display image based on motion images changes, a burden on the user's eyes in a case where a stationary image with no change in the stored data abruptly changes is greater than a case where motion images change.

Therefore, when stationary images form a display image, gradually changing the display image allows reduction in the burden on the user's eyes.

Further, in the embodiments described above, the HMD 100, in which the optical image display sections 26 and 28 transmit an outside scene and allow the user to visually recognize the transmitted outside scene, has been described, but the HMD 100 is not necessarily a head mounted display that transmits an outside scene. For example, the invention is applicable to, among transmissive head mounted displays, a video see-through head mounted display or a non-transmissive closed head mounted display.

C-2. Variation 2

In the first embodiment described above, the display image is classified into 9 types of image data related area in correspondence with 5 types of change in the direction of the sight line and 5 types of change in the orientation of the head. Instead, an image corresponding to the direction of the sight line or the orientation of the head in one-to-one correspondence may be displayed, as in the second embodiment. Similarly, in the second embodiment, in which an image corresponding to the direction of the sight line in one-to-one correspondence is displayed, an image may be displayed in the image display section 20 classified into several areas as in the first embodiment. Further, in the first embodiment described above, the image data related area based on which the display image is displayed is set based on the direction of the user's sight line and the orientation of the user's head, but the display image is not necessarily set based on the orientation of the user's head.

In the first embodiment described above, the direction of the user's sight line is classified into 5 types of direction of the sight line, and the display image is classified into 9 types of image data related area, but the classification of the direction of the user's sight line and the image data related areas based on which the display image is displayed are not limited thereto and can be changed in a variety of manners. For example, the direction of the user's sight line may be classified into not only the 5 types of direction of the sight line in the first embodiment but also 4 types of direction of the sight line, upward and rightward, downward and rightward, upward and leftward, and downward and leftward, or 9 types of direction of the sight line in total, and the number of image data related areas based on which the display image is displayed is increased (16 types (4 types in vertical direction and 4 types in horizontal direction, for example)), so that images related to the greater number of image data related areas may be displayed in correspondence with a combination of the direction of the user's sight line and the orientation of the user's head. The type of the direction of the sight line, the type of the orientation of the head, and the type of the image data related area based on which the display image is displayed can be changed in a variety of manners.

In the embodiments described above, for example, in the processes of steps S16 to S20 and the processes of steps S24 to S30 in FIG. 5, the orientation of the user's head is first identified, and the direction of the user's sight line is then identified. The identification of the orientation of the user's head and the direction of the user's sight line is not necessarily performed in this order and can be changed in a variety of manners. For example, the direction of the user's sight line may first be identified, and the orientation of the user's head may then be identified, followed by display of an image. Still instead, the orientation of the user's head may not be identified, but only the direction of the user's sight line may be identified, and an image may be displayed based on the identified direction of the user's sight line. Still further instead, user's operation may set the order of the identification of the direction of the user's sight line and the identification of the orientation of the user's head.

In the embodiments described above, to identify the direction of the user's sight line, images of the user's eyes captured with the eye imaging cameras 37 and 38 are compared with images of the eyes stored in the eye image DB 122. The method for identifying the direction of the user's sight line is, however, not limited to the method described above and can be changed in a variety of manners. For example, the sight line direction identification section 167 may include an infrared light emitter that irradiates the user's eyes with infrared light and an infrared light receiver that receives the infrared light reflected off the eyes instead of using images of the user's eyes captured with the eye imaging cameras 37 and 38 to identify the size of the user's pupils and the center thereof for identification of the direction of the user's sight line. Further, the eye image DB 122 may store information on the size of the user's pupils and the center thereof in place of data on the captured images of the user's right and left eyes RE, LE. The direction of the user's sight line may instead be identified by using an eye potential sensing technology using the fact that in a human eyeball, the charge on the cornea side differs from the charge on the retina side. The eye potential sensing technology can identify the direction of the user's sight line by using the fact that in a human eyeball, the cornea is positively charged and the retina is negatively charged to detect eye potential that is the difference in potential between the cornea and the retina. Further, in the embodiments described above, images of the user's right and left eyes RE, LE are captured. Instead, only a captured image of a single eye may be used to identify the direction of the user's sight line.

In the first embodiment described above, the display images VI1 and VI2 are images based on image data on stationary images and may instead, for example, be images based on image data formed of a background stationary image on part of which motion images are superimposed. For example, an image displayed in the image display maximum area PN may be a stationary image which contains a tree with flowers as a background and on which motion images in which flowers of the background tree flutter down are superimposed.

C-3. Variation 3

In the embodiments described above, the control section 10 is provided with the operation section 135, but the form of the operation section 135 can be changed in a variety of manners. For example, the operation section 135 may be a user interface that is a component separate from the control section 10. In this case, since the operation section 135 is a component separate from the control section 10, in which the power source 130 and other components are accommodated, the size of the operation section 135 can be reduced, whereby the user can operate the operation section 135 in an improved manner. Further, a camera 61 is disposed in the image display section 20. Instead, the camera 61 may be a component separate from the image display section 20 and may capture an image of the outside scene SC. The HMD 100 may instead be so configured that the CPU 140 and the power supply 130, which form the control section 10, are all incorporated in the image display section 20. The thus configured HMD 100, which does not include the controller configured as a component separate from the image display section 20, can be further reduced in size. The CPU 140 may be incorporated in each of the control section 10 and the image display section 20 so that the control section 10 may be used as a controller on a standalone basis and the image display section 20 may be used as a display apparatus on a standalone basis.

For example, each of the image light generation units may instead include an organic EL (organic electro-luminescence) display and an organic EL control section. Still instead, for example, each of the image light generation units may use an LCOS (liquid crystal on silicon) device (LCoS is a registered trademark), a digital micromirror device, or any other device in place of the LCD. Still further instead, for example, the invention is also applicable to a laser-retina-projection-type HMD 100. Further, the image display maximum area PN may be formed of a MEMS-shutter-based display in which a MEMS shutter formed at each pixel is opened and closed.

Further, for example, the HMD 100 may employ an aspect in which the optical image display sections cover only part of the user's eyes, in other words, the HMD 100 may be a head mounted display having an aspect in which the optical image display sections do not completely cover the user's eyes. Moreover, the HMD 100 may be what is called a monocular head mounted display. Further, the HMD 100 may be replaced, as an image display apparatus, with a handheld display that is not mounted on the user's head but allows the user to hold the apparatus by hand, like binoculars. The HMD 100 is a binocular, optically transmissive apparatus, but the invention is also applicable, for example, to head mounted displays based on other methods, such as a video-transmissive head mounted display.

The HMD 100 may be used as a display apparatus only for displaying an image based on an image signal received from another apparatus. Specifically, the HMD 100 may be used as a display apparatus corresponding to a monitor of a desktop PC. For example, the HMD 100 may receive an image signal from the desktop PC and display an image in the image display maximum area PN of the image display section 20.

The HMD 100 may be so used that it functions as part of a system. For example, the HMD 100 may be used as an apparatus for performing a function of part of a system including an airplane. The system in which the HMD 100 is used is not limited to a system including an airplane and may be a system including an automobile or a bicycle.

Further, each of the earphones may be an ear-hooked-type earphone or a headband-type earphone or may even be omitted. Moreover, for example, the HMD 100 may be configured as a head mounted display incorporated in an automobile, an airplane, or any other vehicle. Further, for example, the HMD 100 may be configured as a head mounted display built in a helmet or any other body protection gear.

C-4. Variation 4

The configuration of the HMD 100 in each of the embodiments described above is presented only by way of example and can be changed in a variety of manners. For example, the direction key 16 provided on the control section 10 may be omitted, or in addition to the direction key 16 and the track pad 14, an operation stick or any other operation interface may be provided. Further, the control section 10 may have a configuration to which a keyboard, a mouse, or any other input device can be connected and may accept an input from the keyboard or the mouse.

As the image display section, the image display section 20 mounted as glasses may be replaced with an image display section mounted, for example, as a cap or any other image display section mounted based on another method. Further, the earphones 32 and 34 can be omitted as appropriate. In the embodiments described above, an LCD and a light source are used to generate image light, and they may be replaced with an organic EL display or any other display device.

Figure 11A:
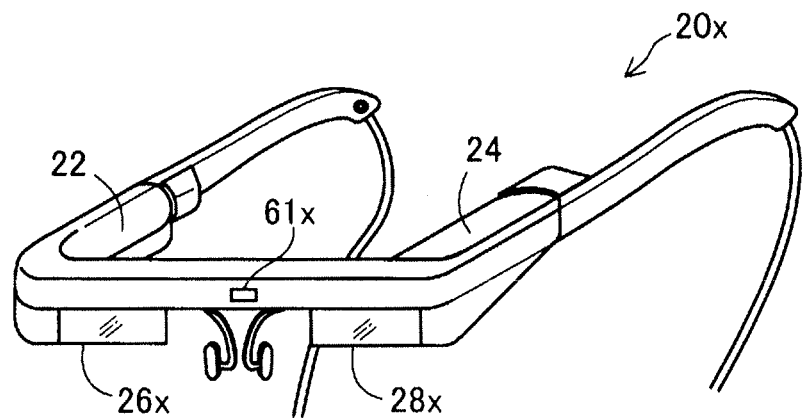
FIGS. 11A and 11B are descriptive diagrams each showing an exterior configuration of an HMD in a variation.
Figure 11B:
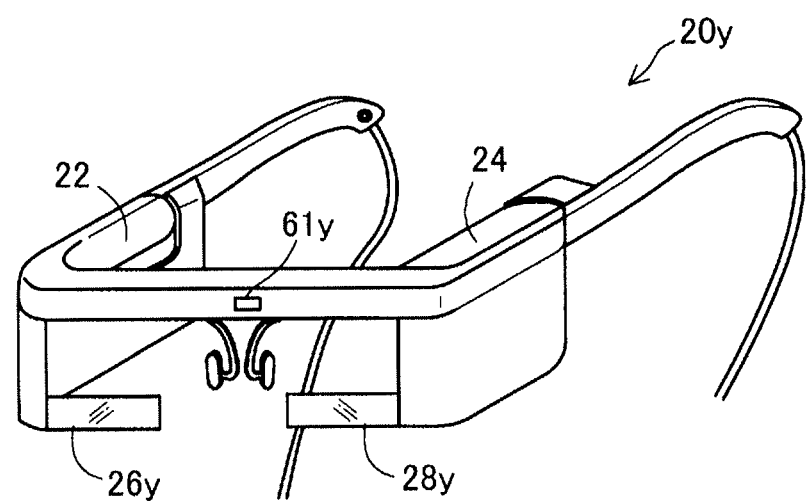

FIGS. 11A and 11B are descriptive diagrams each showing an exterior configuration of an HMD in a variation. An HMD shown in FIG. 11A differs from the HMD 100 shown in FIG. 1 in that an image display section 20x includes a right optical image display section 26x in place of the right optical image display section 26 and a left optical image display section 28x in place of the left optical image display section 28. The right optical image display section 26x is formed to be smaller than the corresponding optical member in the embodiments described above and disposed in a position obliquely upward with respect to the right eye of the user on whom the HMD 100x is mounted. Similarly, the left optical image display section 28x is formed to be smaller than the corresponding optical member in the embodiments described above and disposed in a position obliquely upward with respect to the left eye of the user on whom the HMD 100x is mounted. An HMD shown in FIG. 11B differs from the HMD 100 shown in FIG. 1 in that an image display section 20y includes a right optical image display section 26y in place of the right optical image display section 26 and a left optical image display section 28y in place of the left optical image display section 28. The right optical image display section 26y is formed to be smaller than the corresponding optical member in the embodiments described above and disposed in a position obliquely downward with respect to the right eye of the user on whom the head mounted display is mounted. The left optical image display section 28y is formed to be smaller than the corresponding optical member in the embodiments described above and disposed in a position obliquely downward with respect to the left eye of the user on whom the head mounted display is mounted. As described above, the optical image display sections only need to be disposed in positions in the vicinity of the user's eyes. Further, the optical member that forms each of the optical image display sections can be arbitrarily sized, and the HMD 100 can be implemented in an aspect in which the optical image display sections cover only part of the user's eyes, in other words, an aspect in which the optical image display sections do not completely cover the user's eyes.

In the embodiments described above, the HMD 100 may guide image light fluxes representing the same image to the user's right and left eyes to allow the user to visually recognize a two-dimensional image or may guide image light fluxes representing images different from each other to the user's right and left eyes to allow the user to visually recognize a three-dimensional image.

In the embodiments described above, part of the configuration achieved by hardware may be replaced with software. Conversely, part of the configuration achieved by software may be replaced with hardware. For example, in the embodiments described above, the image processing section 160 and the voice processing section 170 are achieved by the CPU 140 that reads and executes computer programs, and these functional sections may instead be achieved in the form of hardware circuits.

When part or entirety of the functions of the invention is achieved by software, the software (computer program) can be provided in the form of a computer readable recording medium. In the invention, the "computer readable recording medium" is not limited to a flexible disk, a CD-ROM, or any other portable recording medium and may include a variety of RAMs, ROMs, and other internal storage devices in a computer and a hard disk drive and other external storage devices fixed to a computer.

In the embodiments described above, the control section 10 and the image display section 20 are components separate from each other as shown in FIGS. 1 and 2, but the control section 10 and the image display section 20 are not necessarily configured as described above and can be changed in a variety of manners. For example, entirety or part of the components formed in the control section 10 may be formed in the image display section 20. Further, the power source 130 in the embodiments described above may be formed as an exchangeable, independent component, and the components formed in the control section 10 may be redundantly formed in the image display section 20. For example, the CPU 140 shown in FIG. 2 may be formed in both the control section 10 and the image display section 20, and the CPU 140 formed in the control section 10 and a CPU formed in the image display section 20 may function differently.

The invention is not limited to the embodiments or the variations described above and can be implemented in a variety of other configurations to the extent that they do not depart from the substance of the invention. For example, technical features in the embodiments and the variations that correspond to the technical features in the aspects described in the section of Summary can be exchanged or combined with each other as appropriate in order to achieve part or entirety of the advantageous effects described above. Further, if any of the technical features is not described as an essential part in the present specification, the technical feature can be omitted as appropriate.

The entire disclosure of Japanese Patent Application No. 2014-213543, filed Oct. 20, 2014 is expressly incorporated by reference herein.

What is claimed is:

1. A head mounted display comprising:
   a sight line direction detection section that detects the direction of a user's sight line;
   an image display section that has an image display area where an image is displayed; and
   a display image setting section that allows display of at least part of an image in the image display area and changes, based on the detected direction of the sight line, at least one of the at least part of the image displayed in the image display area and a display position of the image displayed in the image display area,
   wherein when a size of an image based on image data stored in a storage section is greater than a size of a largest image displayed in the image display section, the display image setting section selects part of the image data stored in the storage section based on the direction of the sight line and causes the image display section to display the selected part of the image data stored in the storage section.

2. The head mounted display according to claim 1,
   wherein the image display area is divided into a plurality of areas,
   at least two of the plurality of divided areas share at least a portion as a common area, and to change the display position based on the identified direction of the sight line, the display image setting section selects one of the plurality of areas that is related to the direction of the sight line and allows display of an image in the selected one area.

3. The head mounted display according to claim 2,
wherein when the image is formed of a stationary image, the display image setting section selects one of the plurality of areas that is related to the direction of the sight line and allows display of the stationary image in the selected one area.

4. The head mounted display according to claim 1,
wherein the display image setting section changes at least one of the at least part of the image displayed in the image display area and the display position at a speed slower than the speed at which the detected direction of the sight line changes.

5. The head mounted display according to claim 1,
wherein the display image setting section sets the relationship between the speed at which the detected direction of the sight line changes and the speed at which the image displayed in the image display area changes differently depending on whether the image is formed of motion images or stationary images.

6. The head mounted display according to claim 1,
wherein the sight line direction detection section captures images of the user's eyes and detects the direction of the sight line based on the captured images of the user's eyes.

7. The head mounted display according to claim 6,
wherein the storage section includes an eye image storage section that stores a plurality of images of the user's eyes from which the sight lines are oriented in different directions,
wherein the sight line direction detection section compares the captured images of the user's eyes with the plurality of stored images of the user's eyes to detect the direction of the sight line.

8. The head mounted display according to claim 1, further comprising:
a head orientation detection section that detects the orientation of the user's head,
wherein the display image setting section changes, based on the detected orientation of the head and the detected direction of the sight line, at least one of the at least part of the image displayed in the image display area and the display position.

9. The head mounted display according to claim 1,
wherein the image display section transmits an outside scene, and
when the detected sight line is oriented frontward, the display image setting section allows display of an image in an area except a central area of the image display area, and when the direction of the sight line changes from the frontward direction to a direction other than the frontward direction, the display image setting section allows display of an image related to the direction of the sight line after the change in the image display area including the central area.

10. The head mounted display according to claim 1,
wherein the image and the display position of the image are changed in at least a forward, rightward, leftward, upward, or downward direction in correspondence to whether the detected direction of the line of sight of the user is in at least the forward, rightward, leftward, upward, or downward direction.

11. A method for controlling a head mounted display including an image display section having an image display area where an image is displayed, the method comprising:
detecting the direction of a user's sight line;
allowing display of at least part of an image in the image display area and changing, based on the detected direction of the sight line, at least one of the at least part of the image displayed in the image display area and a display position of the image displayed in the image display area; and
when a size of an image based on image data stored in a storage section is greater than a size of a largest image displayed in the image display section, selecting part of the image data stored in the storage section based on the direction of the sight line, and causing the image display section to display the selected part of the image data stored in the storage section.

12. A computer program product for a head mounted display including an image display section having an image display area where an image is displayed, the computer program product being embodied on a non-transitory distribution medium readable by a computer and comprising program instructions, which when loaded into a computer, execute a method comprising:
detecting the direction of a user's sight line;
allowing display of at least part of an image in the image display area and changing, based on the detected direction of the sight line, at least one of the at least part of the image displayed in the image display area and a display position of the image displayed in the image display area; and
when a size of an image based on image data stored in a storage section is greater than a size of a largest image displayed in the image display section, selecting part of the image data stored in the storage section based on the direction of the sight line, and causing the image display section to display the selected part of the image data stored in the storage section.

* * * * *